United States Patent
Saitoh

(10) Patent No.: US 10,154,063 B2
(45) Date of Patent: Dec. 11, 2018

(54) DEVICE MANAGEMENT APPARATUS, DEVICE MANAGEMENT SYSTEM, AND SECURITY SETTING METHOD

(71) Applicant: Atsuhisa Saitoh, Kanagawa (JP)

(72) Inventor: Atsuhisa Saitoh, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 30 days.

(21) Appl. No.: 15/028,875

(22) PCT Filed: Oct. 1, 2014

(86) PCT No.: PCT/JP2014/076869
§ 371 (c)(1),
(2) Date: Apr. 12, 2016

(87) PCT Pub. No.: WO2015/056608
PCT Pub. Date: Apr. 23, 2015

(65) Prior Publication Data
US 2016/0261636 A1    Sep. 8, 2016

(30) Foreign Application Priority Data

Oct. 17, 2013  (JP) ................................. 2013-216816
May 7, 2014    (JP) ................................. 2014-096171

(51) Int. Cl.
*H04L 29/00*   (2006.01)
*H04L 29/06*   (2006.01)
*G06F 21/62*   (2013.01)

(52) U.S. Cl.
CPC .......... *H04L 63/20* (2013.01); *G06F 21/6218* (2013.01)

(58) Field of Classification Search
CPC .............................. H04L 63/20; G06F 21/6218
(Continued)

(56) References Cited

U.S. PATENT DOCUMENTS 6,510,513 B1 * 1/2003 Danieli ................... G06F 21/64
380/279
2005/0283823 A1   12/2005 Okajo et al.
(Continued)

FOREIGN PATENT DOCUMENTS

EP    2 357 584 A1    8/2011
JP    2005-4549       1/2005
(Continued)

OTHER PUBLICATIONS

Extended European Search Report dated Aug. 9, 2016 in Patent Application No. 14853420.9.
(Continued)

*Primary Examiner* — Anthony D Brown
*Assistant Examiner* — Michael D Anderson
(74) *Attorney, Agent, or Firm* — Oblon, McClelland, Maier & Neustadt, L.L.P.

(57) ABSTRACT

A device management apparatus includes a setting information acquisition unit that acquires setting information of one or more security setting items from a device; a policy information acquisition unit that acquires policy information defining a single piece of compliant information, a plurality of pieces of compliant information, or a compliant range, for each security setting item; a determination unit that determines whether each of the setting information of the one or more security setting items conforms, based on the policy information; a change unit that changes, when the setting information of any security setting item does not conform, the setting information so as to conform; and a distribution unit that distributes the changed setting information of the security setting item to the device.

13 Claims, 16 Drawing Sheets

(58) Field of Classification Search
USPC .......................................................... 726/1
See application file for complete search history.

(56) References Cited

U.S. PATENT DOCUMENTS

| | | |
|---|---|---|
| 2011/0191817 A1 | 8/2011 | Oh et al. |
| 2011/0314542 A1* | 12/2011 | Viswanathan ........ G06F 21/554 |
| | | 726/23 |
| 2014/0047504 A1 | 2/2014 | Tsuchitoi |
| 2014/0123210 A1 | 5/2014 | Tsuchitoi |
| 2016/0112459 A1 | 4/2016 | Tsuchitoi |

FOREIGN PATENT DOCUMENTS

| | | |
|---|---|---|
| JP | 2006-040247 | 2/2006 |
| JP | 2007-185814 | 7/2007 |
| JP | 2013-156757 | 8/2013 |
| JP | 2013-167983 | 8/2013 |
| KR | 10-2011-0089650 A | 8/2011 |
| WO | WO 2012/153671 A1 | 11/2012 |
| WO | WO 2013/111554 A1 | 8/2013 |

OTHER PUBLICATIONS

Office Action dated Dec. 21, 2016 in Korean Patent Application No. 10-2016-7009804 (with English translation).
International Search Report dated Jan. 13, 2015 in PCT/JP2014/076869 filed on Oct. 1, 2014.
Office Action dated Jun. 26, 2018 in Japanese Application No. 2014-096171 filed May 7, 2014.

* cited by examiner

FIG.3

| SECURITY SETTING ITEM | TYPE | CONDITION | COMPLIANT VALUE/ COMPLIANT RANGE | DEFAULT VALUE |
|---|---|---|---|---|
| ... | ... | ... | ... | ... |
| HDD OVERWRITE ERASURE | FIXED | NONE | EFFECTIVE | |
| HDD OVERWRITE ERASURE ALGORITHM | SELECTED | NONE | RANDOM NUMBER/NSA/DoD | NSA |
| NUMBER OF TIMES OF HDD OVERWRITE ERASURE | RANGE | HDD OVERWRITE ERASURE ALGORITHM = RANDOM NUMBER | 3~9 | 3 |
| ... | ... | ... | ... | ... |
| S/MIME | FIXED | NONE | EFFECTIVE | |
| S/MIME ENCRYPTION ALGORITHM | SELECTED | NONE | 3DES/AES128 | 3DES |
| S/MIME SIGNATURE ALGORITHM | SELECTED | NONE | SHA1/SHA256 | SHA1 |
| ... | ... | ... | ... | ... |

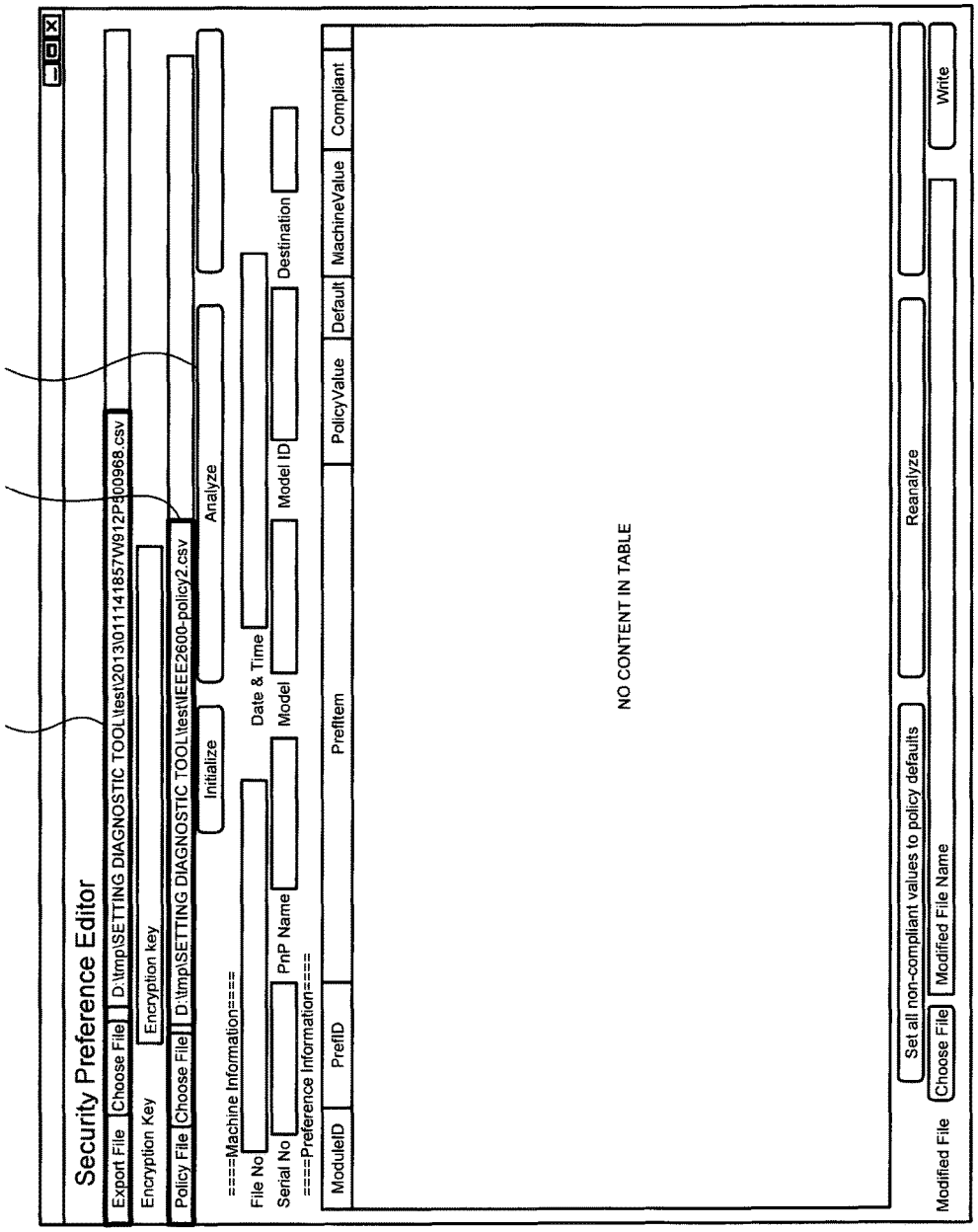

FIG.5

Security Preference Editor

Export File [Choose File] D:\tmp\SETTING DIAGNOSTIC TOOL\test\20130101114 1857W912P500968.csv Encryption Key [Encryption key]

Policy File [Choose File] D:\tmp\SETTING DIAGNOSTIC TOOL\test\IEEE2600-policy2.csv

[Initialize]  [Analyze]  211 → [Non-compliant]

====Machine Information====

| File No | 20130611141857W912P500968 | | Date & Time | 2013-06-11T14:18:57+09:00 | | | |
|---|---|---|---|---|---|---|---|
| Serial No | W912P500968 | PnP Name | XXXXX | Model | Aficio MP 301 | Model ID | 00570002 | Destination | 1 |

====Preference Information====

| ModuleID | PrefID | PrefItem | PolicyValue | Default | MachineValue | Compliant |
|---|---|---|---|---|---|---|
| 2 | 150080 | MANAGER AUTHENTICATION MANAGEMENT: MANAGER AUTHENTICATION MANAGEMENT: DOCUMENT MANAGEMENT | 32 | | 32 | |
| 2 | 150233 | SECURITY ENHANCEMENT: PERSONAL DESTINATION REGISTRATION RESTRICTION (FAX) | 1 | | 1 | |
| 2 | 150234 | SECURITY ENHANCEMENT: PERSONAL DESTINATION REGISTRATION RESTRICTION (SCANNER) | 1 | | 1 | |
| 2 | 150231 | SECURITY ENHANCEMENT: DESTINATION USE RESTRICTION (FAX) | 1 | | 1 | |
| 2 | 150232 | SECURITY ENHANCEMENT: DESTINATION USE RESTRICTION (SCANNER) | 1 | | 1 | |
| 2 | 150235 | SECURITY ENHANCEMENT: PERSONAL DESTINATION DISPLAY RESTRICTION | 1 | | 1 | |
| 2 | 150239 | SECURITY ENHANCEMENT: TRANSFER TO SPECIFIED RECEPTION DESTINATION (FAX) | 2 | | 2 | |
| 2 | 150241 | SECURITY ENHANCEMENT: EXECUTION OF AUTHENTICATION REGARDING RUNNING JOB | 1 | | 1 | |
| 2 | 150242 | SECURITY ENHANCEMENT: COMPLEXITY RESTRICTION | 1/2 | 1 | 1 | |
| 2 | 150243 | SECURITY ENHANCEMENT: 0 INDICATES NO RESTRICTION OF MINIMUM NUMBER OF CHARACTERS | 8-32 | 8 | 0 | Non-compliant ← 212 |
| 2 | 150244 | SECURITY ENHANCEMENT: @Remote SERVICE | 0/2 | 2 | 2 | |
| 2 | 150245 | SECURITY ENHANCEMENT: FIRMWARE UPDATE | 1 | | 1 | |
| 2 | 150246 | SECURITY ENHANCEMENT: FIRMWARE CONFIGURATION MODIFICATION | 1 | | 1 | |
| 2 | 150249 | SECURITY ENHANCEMENT: SELECTION | 0 | | 0 | |
| 2 | 150258 | AUTOMATIC ERASURE OF ACCUMULATED DOCUMENT IN DOCUMENT BOX | 0-180 | 0 | 0 | |
| 2 | 150297 | SERVICE MODE SHIFTING PROHIBITION SETTING | 1 | | 1 | |
| 2 | 150300 | MEMORY AUTOMATIC ERASURE SETTING/SELECTION | 1 | | 1 | |

[Set all non-compliant values to policy defaults]  [Reanalyze]

Modified File [Choose File]  Modified File Name  [Write]

FIG. 6

Security Preference Editor

Export File [Choose File] D:\tmp\SETTING DIAGNOSTIC TOOL\test\20130111141857W912P500968.csv
Encryption Key [Encryption key]
Policy File [Choose File] D:\tmp\SETTING DIAGNOSTIC TOOL\test\IEEE2600-policy2.csv

[Initialize]  [Analyze]  Non-compliant

====Machine Information====
| File No | 20130611141857W912P500968 | | | Date & Time | 2013-06-11T14:18:57+09:00 | | |
|---|---|---|---|---|---|---|---|
| Serial No | W912P500968 | PnP Name | XXXXX | Model | Aficio MP 301 | Model ID | 00570002 | Destination | 1 |

====Preference Information====

| ModuleID | PrefID | PrefItem | PolicyValue | Default | MachineValue | Compliant |
|---|---|---|---|---|---|---|
| 2 | 150080 | MANAGER AUTHENTICATION MANAGEMENT: MANAGER AUTHENTICATION MANAGEMENT: DOCUMENT MANAGEMENT | 32 | | 32 | |
| 2 | 150233 | SECURITY ENHANCEMENT: PERSONAL DESTINATION REGISTRATION RESTRICTION (FAX) | 1 | | 1 | |
| 2 | 150234 | SECURITY ENHANCEMENT: PERSONAL DESTINATION REGISTRATION RESTRICTION (SCANNER) | 1 | | 1 | |
| 2 | 150231 | SECURITY ENHANCEMENT: DESTINATION USE RESTRICTION (FAX) | 1 | | 1 | |
| 2 | 150232 | SECURITY ENHANCEMENT: DESTINATION USE RESTRICTION (SCANNER) | 1 | | 1 | |
| 2 | 150235 | SECURITY ENHANCEMENT: PERSONAL DESTINATION DISPLAY RESTRICTION | 1 | | 1 | |
| 2 | 150239 | SECURITY ENHANCEMENT: TRANSFER TO SPECIFIED RECEPTION DESTINATION (FAX) | 1 | | 1 | |
| 2 | 150241 | SECURITY ENHANCEMENT: EXECUTION OF AUTHENTICATION REGARDING RUNNING JOB | 2 | | 2 | |
| 2 | 150242 | SECURITY ENHANCEMENT: COMPLEXITY RESTRICTION | 1/2 | 1 | 1 | |
| 2 | 150243 | SECURITY ENHANCEMENT: 0 INDICATES NO RESTRICTION OF MINIMUM NUMBER OF CHARACTERS | 8-32 | 8 | 0 | Non-compliant |
| 2 | 150244 | SECURITY ENHANCEMENT: @Remote SERVICE | 0/2 | 2 | 2 | |
| 2 | 150245 | SECURITY ENHANCEMENT: FIRMWARE UPDATE | 1 | | 1 | |
| 2 | 150246 | SECURITY ENHANCEMENT: FIRMWARE CONFIGURATION MODIFICATION | 1 | | 1 | |
| 2 | 150249 | SECURITY ENHANCEMENT: SELECTION | 0 | | 0 | |
| 2 | 150258 | AUTOMATIC ERASURE OF ACCUMULATED DOCUMENT IN DOCUMENT BOX | 0-180 | 0 | 0 | |
| 2 | 150297 | SERVICE MODE SHIFTING PROHIBITION SETTING | 1 | | 1 | |
| 2 | 150300 | MEMORY AUTOMATIC ERASURE SETTING/SELECTION | 1 | | 1 | |

[Set all non-compliant values to policy defaults] [Reanalyze]

Modified File [Choose File] [Modified File Name]  [Write]

FIG.7

Security Preference Editor

Export File [Choose File] D:\tmp\SETTING DIAGNOSTIC TOOL\test\20130611141857W912P500968.csv
Encryption Key [Encryption Key]
Policy File [Choose File] D:\tmp\SETTING DIAGNOSTIC TOOL\test\IEEE2600-policy2.csv

[Initialize]  [Analyze]  Non-compliant

====Machine Information====
File No: 20130611141857W912P500968  Date & Time: 2013-06-11T14:18:57+09:00
Serial No: W912P500968  PnP Name: XXXX  Model: Aficio MP 301  Model ID: 00570002  Destination: 1

====Preference Information====

| ModuleID | PrefID | PrefItem | PolicyValue | Default | MachineValue | Compliant |
|---|---|---|---|---|---|---|
| 2 | 150080 | MANAGER AUTHENTICATION MANAGEMENT: MANAGER AUTHENTICATION MANAGEMENT: DOCUMENT MANAGEMENT | 32 | | 32 | |
| 2 | 150233 | SECURITY ENHANCEMENT: PERSONAL DESTINATION REGISTRATION RESTRICTION (FAX) | 1 | | 1 | |
| 2 | 150234 | SECURITY ENHANCEMENT: PERSONAL DESTINATION REGISTRATION RESTRICTION (SCANNER) | 1 | | 1 | |
| 2 | 150231 | SECURITY ENHANCEMENT: DESTINATION USE RESTRICTION (FAX) | 1 | | 1 | |
| 2 | 150232 | SECURITY ENHANCEMENT: DESTINATION USE RESTRICTION (SCANNER) | 1 | | 1 | |
| 2 | 150235 | SECURITY ENHANCEMENT: PERSONAL DESTINATION DISPLAY RESTRICTION | 1 | | 1 | |
| 2 | 150239 | SECURITY ENHANCEMENT: TRANSFER TO SPECIFIED RECEPTION DESTINATION (FAX) | 2 | | 2 | |
| 2 | 150241 | SECURITY ENHANCEMENT: EXECUTION OF AUTHENTICATION REGARDING RUNNING JOB | 1 | | 1 | |
| 2 | 150242 | SECURITY ENHANCEMENT: COMPLEXITY RESTRICTION | 1/2 | 1 | 1 | |
| 2 | 150243 | SECURITY ENHANCEMENT: 0 INDICATES NO RESTRICTION OF MINIMUM NUMBER OF CHARACTERS | 8-32 | 8 | 8 | Non-compliant |
| 2 | 150244 | SECURITY ENHANCEMENT: @Remote SERVICE | 0/2 | 2 | 2 | |
| 2 | 150245 | SECURITY ENHANCEMENT: FIRMWARE UPDATE | 1 | | 1 | |
| 2 | 150246 | SECURITY ENHANCEMENT: FIRMWARE CONFIGURATION MODIFICATION | 1 | | 1 | |
| 2 | 150249 | SECURITY ENHANCEMENT: SELECTION | 0 | | 0 | |
| 2 | 150258 | AUTOMATIC ERASURE OF ACCUMULATED DOCUMENT IN DOCUMENT BOX | 0-180 | 0 | 0 | |
| 2 | 150297 | SERVICE MODE SHIFTING PROHIBITION SETTING | 1 | | 1 | |
| 2 | 150300 | MEMORY AUTOMATIC ERASURE SETTING/SELECTION | 1 | | 1 | |

Set all non-compliant values to policy defaults  [Reanalyze]

Modified File [Choose File]  Modified File Name  [Write]

| ModuleID | PrefID | PrefItem | PolicyValue | Default | MachineValue | Compliant |
|---|---|---|---|---|---|---|
| 2 | 150080 | MANAGER AUTHENTICATION MANAGEMENT: MANAGER AUTHENTICATION MANAGEMENT: DOCUMENT MANAGEMENT | 32 | | 32 | |
| 2 | 150233 | SECURITY ENHANCEMENT: PERSONAL DESTINATION REGISTRATION RESTRICTION (FAX) | 1 | | 1 | |
| 2 | 150234 | SECURITY ENHANCEMENT: PERSONAL DESTINATION REGISTRATION RESTRICTION (SCANNER) | 1 | | 1 | |
| 2 | 150231 | SECURITY ENHANCEMENT: DESTINATION USE RESTRICTION (FAX) | 1 | | 1 | |
| 2 | 150232 | SECURITY ENHANCEMENT: DESTINATION USE RESTRICTION (SCANNER) | 1 | | 1 | |
| 2 | 150235 | SECURITY ENHANCEMENT: PERSONAL DESTINATION DISPLAY RESTRICTION | 1 | | 1 | |
| 2 | 150239 | SECURITY ENHANCEMENT: TRANSFER TO SPECIFIED RECEPTION DESTINATION (FAX) | 2 | | 2 | |
| 2 | 150241 | SECURITY ENHANCEMENT: EXECUTION OF AUTHENTICATION REGARDING RUNNING JOB | 1 | 1 | 1 | |
| 2 | 150242 | SECURITY ENHANCEMENT: COMPLEXITY RESTRICTION | 1/2 | 1 | 1 | |
| 2 | 150243 | SECURITY ENHANCEMENT: 0 INDICATES NO RESTRICTION OF MINIMUM NUMBER OF CHARACTERS | 8-32 | 8 | 8 | |
| 2 | 150244 | SECURITY ENHANCEMENT: @Remote SERVICE | 0/2 | 2 | 2 | |
| 2 | 150245 | SECURITY ENHANCEMENT: FIRMWARE UPDATE | 1 | | 1 | |
| 2 | 150246 | SECURITY ENHANCEMENT: FIRMWARE CONFIGURATION MODIFICATION | 1 | | 1 | |
| 2 | 150249 | SECURITY ENHANCEMENT: SELECTION | 0 | | 0 | |
| 2 | 150258 | AUTOMATIC ERASURE OF ACCUMULATED DOCUMENT IN DOCUMENT BOX | 0-180 | 0 | 0 | |
| 2 | 150297 | SERVICE MODE SHIFTING PROHIBITION SETTING | 1 | | 1 | |
| 2 | 150300 | MEMORY AUTOMATIC ERASURE SETTING/SELECTION | 1 | | 1 | |

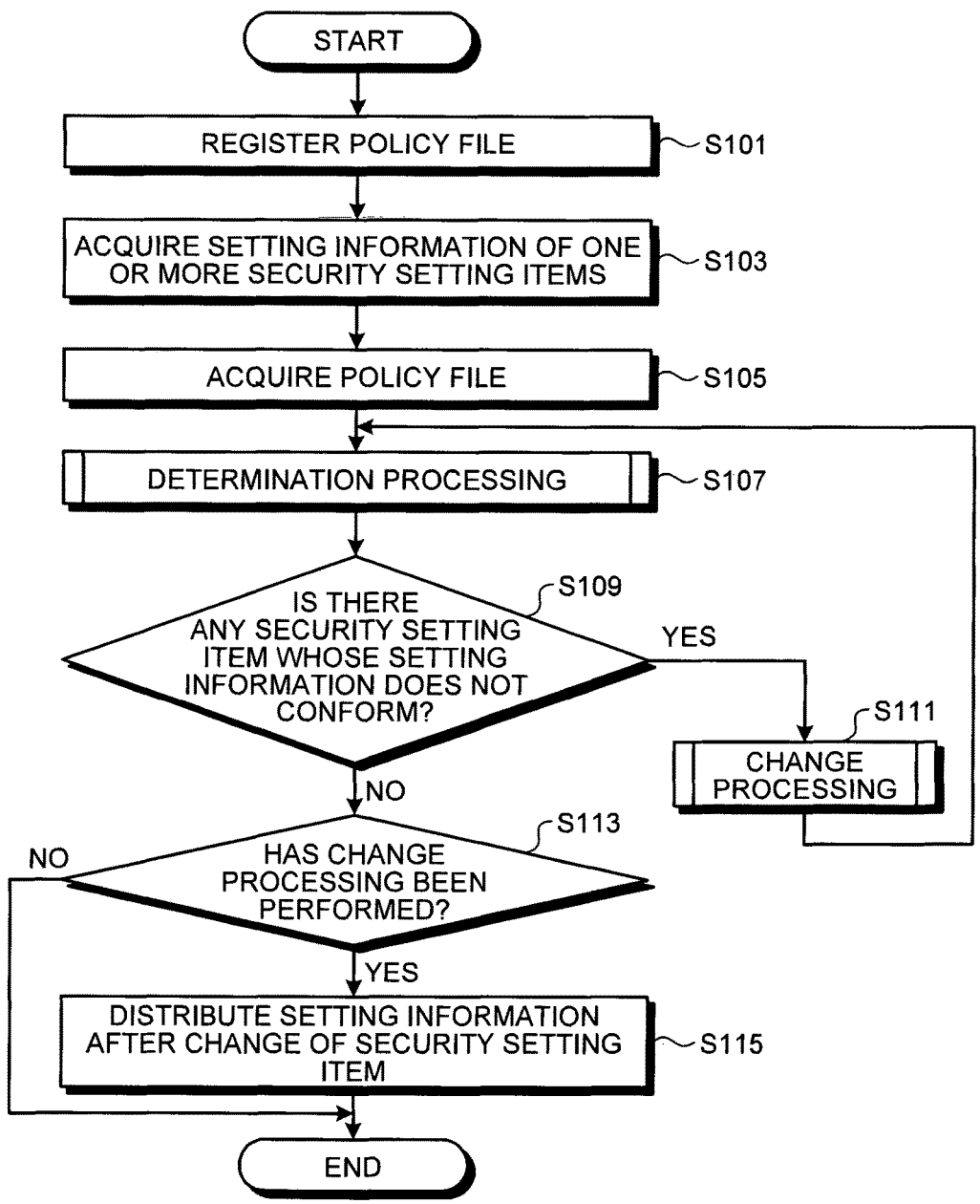

FIG.16

| SECURITY SETTING ITEM | KIND | TYPE | CONDITION | COMPLIANT VALUE/ COMPLIANT RANGE | DEFAULT VALUE |
|---|---|---|---|---|---|
| ... | ... | ... | ... | ... | ... |
| HDD OVERWRITE ERASURE | COMMON | FIXED | NONE | EFFECTIVE | |
| HDD OVERWRITE ERASURE ALGORITHM | MFP PRINTER | SELECTED | NONE | RANDOM NUMBER/NSA/DoD | NSA |
| HDD OVERWRITE ERASURE ALGORITHM | PROJECTOR VIDEO CONFERENCE SYSTEM | FIXED | NONE | RANDOM NUMBER | |
| NUMBER OF TIMES OF HDD OVERWRITE ERASURE | MFP PRINTER | RANGE | HDD OVERWRITE ERASURE ALGORITHM = RANDOM NUMBER | 3 TO 9 | 3 |
| NUMBER OF TIMES OF HDD OVERWRITE ERASURE | PROJECTOR VIDEO CONFERENCE SYSTEM | FIXED | NONE | 3 | |
| ... | ... | ... | ... | ... | ... |
| S/MIME | MFP | FIXED | NONE | EFFECTIVE | |
| S/MIME ENCRYPTION ALGORITHM | MFP | SELECTED | NONE | 3DES/AES128 | 3DES |
| S/MIME SIGNATURE ALGORITHM | MFP | SELECTED | NONE | SHA1/SHA256 | SHA1 |
| ... | | | | | ... |

DEVICE MANAGEMENT APPARATUS, DEVICE MANAGEMENT SYSTEM, AND SECURITY SETTING METHOD

TECHNICAL FIELD

The present invention relates to a device management apparatus, a device management system, and a security setting method.

BACKGROUND ART

Conventionally, there is known a technique of collectively performing security setting for each security level on a plurality of devices (see Japanese Patent Application Laid-open No. 2007-185814, for example). According to such a technique, even when a number of devices are used in an office, security setting of certain level on these devices can be performed easily.

However, the above-described conventional technique aims at security setting focusing mainly on security level, and does not aim at security setting conforming to the standards or authentication related to security. Thus, in the above-described conventional technique, there are many cases in which the security setting of a device cannot be in a state conforming to the standards or authentication.

Moreover, even when the security setting conforming to the standards or authentication is performed for a device, the security setting may become a state not conforming to the standards or authentication, depending on security setting items, due to the use of the device.

Therefore, there is a need to provide a device management apparatus, a device management system, and a security setting method that make it easier to maintain a state where the security setting of a device conforms to the standards or authentication related to security.

SUMMARY OF THE INVENTION

It is an object of the present invention to at least partially solve the problems in the conventional technology.

According to an embodiment, there is provided a device management apparatus that includes: a setting information acquisition unit that acquires setting information of one or more security setting items from a device; a policy information acquisition unit that acquires policy information for each security setting item, the policy information defining a single piece of compliant information, a plurality of pieces of compliant information, or a compliant range; a determination unit that determines whether the setting information of the one or more security setting items conforms to the policy information; a change unit that changes, when a corresponding piece of the setting information of any one of the security setting items does not conform to a corresponding piece of the policy information, the corresponding piece of the setting information so as to conform to the corresponding piece of the policy information; and a distribution unit that distributes the changed setting information of the security setting item to the device.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 3 is a diagram illustrating an example of a policy file according to the first embodiment.

FIG. 4 is a diagram illustrating an example of a start screen of determination according to the first embodiment.

FIG. 5 is a diagram illustrating an example of a list screen of determination results according to the first embodiment.

FIG. 6 is a diagram illustrating an example of a list screen of determination results according to the first embodiment.

FIG. 7 is a diagram illustrating an example of a list screen of change results according to the first embodiment.

FIG. 8 is a diagram illustrating an example of a list screen of redetermination results according to the first embodiment.

FIG. 9 is a flowchart illustrating an example of processing performed by the device management apparatus according to the first embodiment.

FIG. 16 is a diagram illustrating an example of a policy file according to the third embodiment.

DESCRIPTION OF EMBODIMENTS

The following will describe, in detail, embodiments of a device management apparatus, a computer program, a device management system, and a security setting method with reference to the enclosed drawings.

First Embodiment

Figure 1:
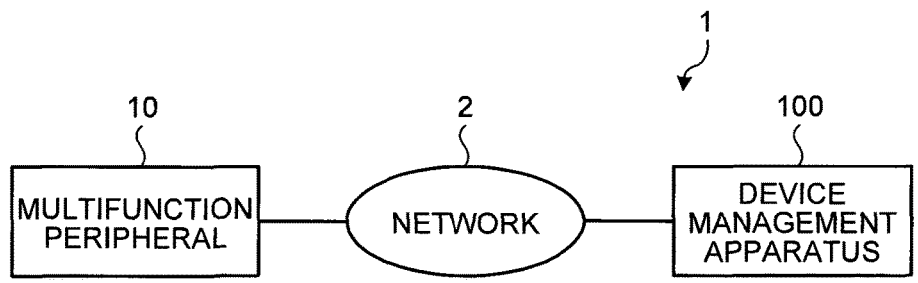
FIG. 1 is a block diagram illustrating an example of a configuration of a device management system according to a first embodiment.

FIG. 1 is a block diagram illustrating an example of a configuration of a device management system 1 according to a first embodiment. As illustrated in FIG. 1, the device management system 1 includes a multifunction peripheral (MFP) 10 (an example of a device) and a device management apparatus 100. The multifunction peripheral 10 has at least two functions among a copying function, a printing function, a scanner function, and a facsimile function. The multifunction peripheral 10 and the device management apparatus 100 are coupled through a network 2. The network 2 can be achieved with a local area network (LAN) or the Internet, for example.

The embodiment exemplifies and describes the case in which a device to be managed by the device management apparatus 100 is the multifunction peripheral 10. However, the device to be managed by the device management apparatus 100 is not limited thereto. The device to be managed by the device management apparatus 100 may be any device that can be connected to the network 2, and includes an image forming apparatus such as a printing device, a copying machine, a scanner device, and a facsimile device, various kinds of electronic devices such as a projector, a video conference system, a camera, an air conditioner, a refrigerator, a fluorescent lamp, a vending machine, and a hand-held type terminal, and an information processing device such as a PC, for example.

Figure 2:
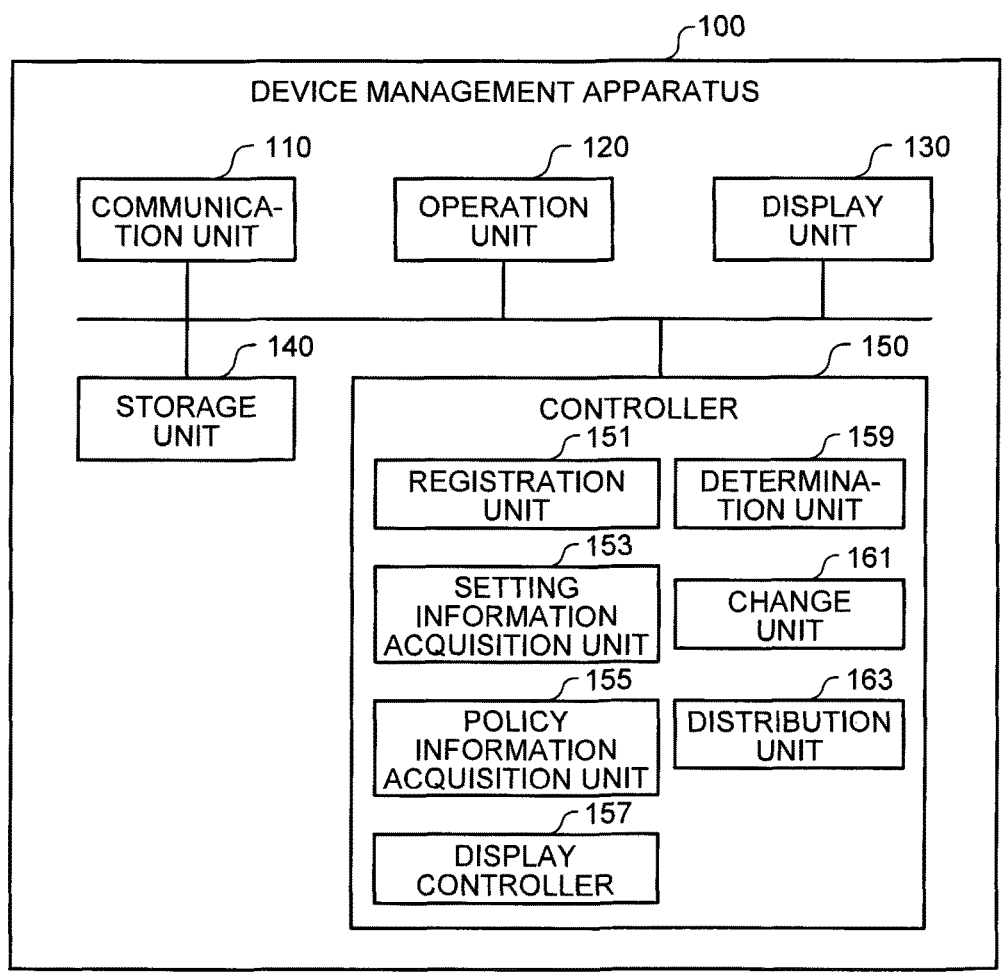
FIG. 2 is a block diagram illustrating an example of a configuration of a device management apparatus according to the first embodiment.

FIG. 2 is a block diagram illustrating an example of a configuration of the device management apparatus 100 according to the first embodiment. As illustrated in FIG. 2, the device management apparatus 100 includes a communication unit 110, an operation unit 120, a display unit 130, a storage unit 140, and a controller 150.

The communication unit 110 communicates with an external device such as the multifunction peripheral 10 through the network 2 and can be achieved by a communication device such as a network interface card (NIC).

The operation unit 120 is used for various types of operation input, and can be achieved with an input device, such as a keyboard, a mouse, a touch pad, or a touch panel.

The display unit 130 displays various screens, and can be achieved with a display device, such as a liquid crystal display or a touch panel display.

The storage unit 140 stores therein various computer programs such as the device management program executed by the device management apparatus 100, and data used for various types of processing performed by the device management apparatus 100, for example. In the embodiment, the storage unit 140 stores therein a policy file (an example of policy information) defining a single piece of compliant information, a plurality of pieces of compliant information, or a compliant range, for each security setting item.

FIG. 3 is a diagram illustrating an example of a policy file according to the first embodiment. The policy file illustrated in FIG. 3 defines the security setting item, the type, the condition, the compliant value/compliant range, and the default value, and they are associated to one another. Note that the compliant value is an example of compliant information, and the default value is an example of default information.

The security setting item is an item for security setting. Note that although the security setting item is supposed to be a security setting item necessary to satisfy standards or authentication related to security in the embodiment, it is not limited thereto. The standards or authentication related to security includes common criteria for information technology security evaluation (CC authentication, ISO15408), for example.

The type is a kind of the compliant value/compliant range, and includes a fixed-type, a selected-type, and a range-type. The condition is a condition (a precondition) necessary for security setting of security setting items. The compliant value/compliant range is a value/range adaptive to security setting items. When the type is a fixed-type, the compliant value/compliant range is a single compliant value. When the type is a selected-type, the compliant value/compliant range is a plurality of compliant values. When the type is a range-type, the compliant value/compliant range is a compliant range. The default value is defined when the type is a selected-type or a range-type. When the type is a selected-type, any of the compliant values is a default value. When the type is a range-type, any value included in the compliant range is a default value.

The storage unit 140 can be achieved by storage devices capable of magnetically, optically, or electrically storing data, such as a hard disk drive (HDD), a solid state drive (SSD), a memory card, an optical disk, a read only memory (ROM), and a random access memory (RAM).

The controller 150 controls each unit of the device management apparatus 100, and can be achieved by a control device such as a central processing unit (CPU). The controller 150 includes a registration unit 151, a setting information acquisition unit 153, a policy information acquisition unit 155, a display controller 157, a determination unit 159, a change unit 161, and a distribution unit 163.

Here, the controller 150 activates (executes) a device management program stored in the storage unit 140, thereby achieving, as software, the registration unit 151, the setting information acquisition unit 153, the policy information acquisition unit 155, the display controller 157, the determination unit 159, the change unit 161, and the distribution unit 163.

The registration unit 151 registers a policy file in the storage unit 140. To be more specific, the registration unit 151 registers a policy file in the storage unit 140 based on a registration instruction (registration operation input) by a user from the operation unit 120. In this manner, the storage unit 140 stores therein the policy file.

The setting information acquisition unit 153 acquires setting information of one or more security setting items from the multifunction peripheral 10. In the embodiment, the setting information acquisition unit 153 performs communication using a protocol used for device management such as a simple network management protocol (SNMP), with the multifunction peripheral 10, and acquires, from the multifunction peripheral 10, a setting file defining each of one or more security setting items and setting information of the security setting items in an associated manner.

Note that the setting file is a file used for security setting in the multifunction peripheral 10. The security setting in the multifunction peripheral 10 is performed regarding security setting items defined by the setting file, using the associated setting information.

The policy information acquisition unit 155 acquires a policy file. In the embodiment, the policy information acquisition unit 155 acquires a policy file from the storage unit 140.

The display controller 157 performs, on the display unit 130, screen display for the confirmation of a state of security setting of the device and the security setting in the device.

For example, the display controller 157 displays, on the display unit 130, a start screen of determination made by the determination unit 159, as illustrated in FIG. 4. Here, the input by the user from the operation unit 120 specifies a file path of a setting file for an input field 201 and a file path of a policy file for an input field 202, and the later-described determination processing by the determination unit 159 is started once an Analyze button 203 is selected.

The determination unit 159 determines whether each of setting information of one or more security setting items defined by the setting file acquired by the setting information acquisition unit 153 conforms, based on the policy file acquired by the policy information acquisition unit 155.

To be more specific, when the policy file defines a single piece of compliant information for a security setting item to be determined, that is, when the type is a fixed-type, the determination unit 159 determines whether the setting information of the security setting item conforms to the single piece of compliant information of the security setting item.

Moreover, when the policy file defines a plurality of pieces of compliant information for a security setting item to be determined, that is, when the type is a selected-type, the determination unit 159 determines whether the setting information of the security setting item conforms to any of the pieces of compliant information of the security setting item.

Moreover, when the policy file defines a compliant range for a security setting item to be determined, that is, when the type is a range-type, the determination unit 159 determines whether the setting information of the security setting item conforms to the compliant range of the security setting item.

Here, the display controller 157 is described again. For example, when the determination unit 159 has finished determination processing, the display controller 157 displays, on the display unit 130, a list screen of determination results by the determination unit 159, as illustrated in FIG. 5.

For example, in the case of the security setting item displayed on a display field 212, the PolicyValue (a compliant range) is 8 to 32, while the MachineValue (a setting value as an example of setting information) is 0. Thus, the determination unit 159 has determined that the setting value does not conform to the compliant range, and has determined as being non-compliant. Then, as a determination result of one or more security setting items defined by the setting file, "Non-compliant" is displayed on a display field 211.

In this case, the user makes a change instruction (change operation input) from the operation unit 120. When a button 213 for change to a default value is selected on the list screen of the determination results illustrated in FIG. 6, the later-described change processing by the change unit 161 is started.

When the setting information of any security setting item (hereinafter, referred to as "a security setting item to be changed") of one or more security setting items defined by the setting file acquired by the setting information acquisition unit 153, does not conform, as a result of the determination made by the determination unit 159, the change unit 161 changes the setting information so as to conform.

To be more specific, when the policy file defines a plurality of pieces of compliant information or a compliant range for the security setting item to be changed, that is, when the type is a selected-type or a range-type, the change unit 161 changes the setting information of the security setting item to be changed to default information of the security setting item to be changed.

When the policy file defines a single piece of compliant information for the security setting item to be changed, that is, when the type is a fixed-type, the change unit 161 changes the setting information of the security setting item to be changed to the piece of compliant information of the security setting item to be changed.

The change unit 161 then generates a setting file after change in which the non-compliant setting information has been changed to default information or compliant information by change processing.

Here, the display controller 157 is described again. For example, when the change processing by the change unit 161 has been finished, the display controller 157 displays a list screen of change results by the change unit 161 on the display unit 130, as illustrated in FIG. 7.

In the example illustrated in FIG. 7, the MachineValue (a setting value) is changed to 8 that is a Default value in the security setting item displayed on the display field 212. Here, when a Reanalyze button 214 is selected through input by the user from the operation unit 120, the above-described determination processing by the determination unit 159 is performed again.

When the redetermination processing by the determination unit 159 has been finished, the display controller 157 displays a list screen of determination results by the determination unit 159 on the display unit 130, as illustrated in FIG. 8. In the example illustrated in FIG. 8, the setting values of all security setting items defined by the setting file conform. Thus, "Compliant" is displayed on a display field 215, as a determination result.

Moreover, when "Compliant" is displayed on the display field 215, a file path of a setting file after change generated by the change unit 161 is specified on an input field 216. Thus, the setting file after change is stored in the storage unit 140 by a storing instruction (storing operation input) by the user from the operation unit 120.

The distribution unit 163 distributes the changed setting information of the security setting item to be changed by the change unit 161 to the multifunction peripheral 10. To be more specific, the distribution unit 163 acquires the setting file after change generated by the change unit 161 from the storage unit 140 and distributes the setting file to the multifunction peripheral 10.

The security setting of the multifunction peripheral 10 is performed thereafter using the setting file after change distributed from the device management apparatus 100.

FIG. 9 is a flowchart illustrating an example of processing performed by the device management apparatus 100 according to the first embodiment.

First, the registration unit 151 registers a policy file in the storage unit 140 based on a registration instruction (registration operation input) by the user from the operation unit 120 (Step S101).

Next, the setting information acquisition unit 153 acquires a setting file defining setting information of one or more security setting items from the multifunction peripheral 10 (Step S103).

The policy information acquisition unit 155 then acquires a policy file from the storage unit 140 (Step S105).

The determination unit 159 then performs determination processing for determining whether each piece of the setting information of one or more security setting items defined by the setting file acquired by the setting information acquisition unit 153 conforms, based on the policy file acquired by the policy information acquisition unit 155 (Step S107).

When there is a security setting item whose setting information does not conform (Yes at Step S109), as a result of the determination processing by the determination unit 159, the change unit 161 performs change processing for changing the setting information so as to conform (Step S111), and the processing returns to Step S107.

By contrast, when there is no security setting item whose setting information does not conform (No at Step S109), as a result of the determination processing by the determination unit 159, and if the change processing at Step S111 has been performed (Yes at Step S113), the distribution unit 163 distributes a setting file after change defining setting information after change by change processing to the multifunction peripheral 10 (Step S115).

Note that when the change processing at Step S111 has not been performed (No at Step S113), the processing at Step S115 is not performed, and the processing is finished.

Figure 10:
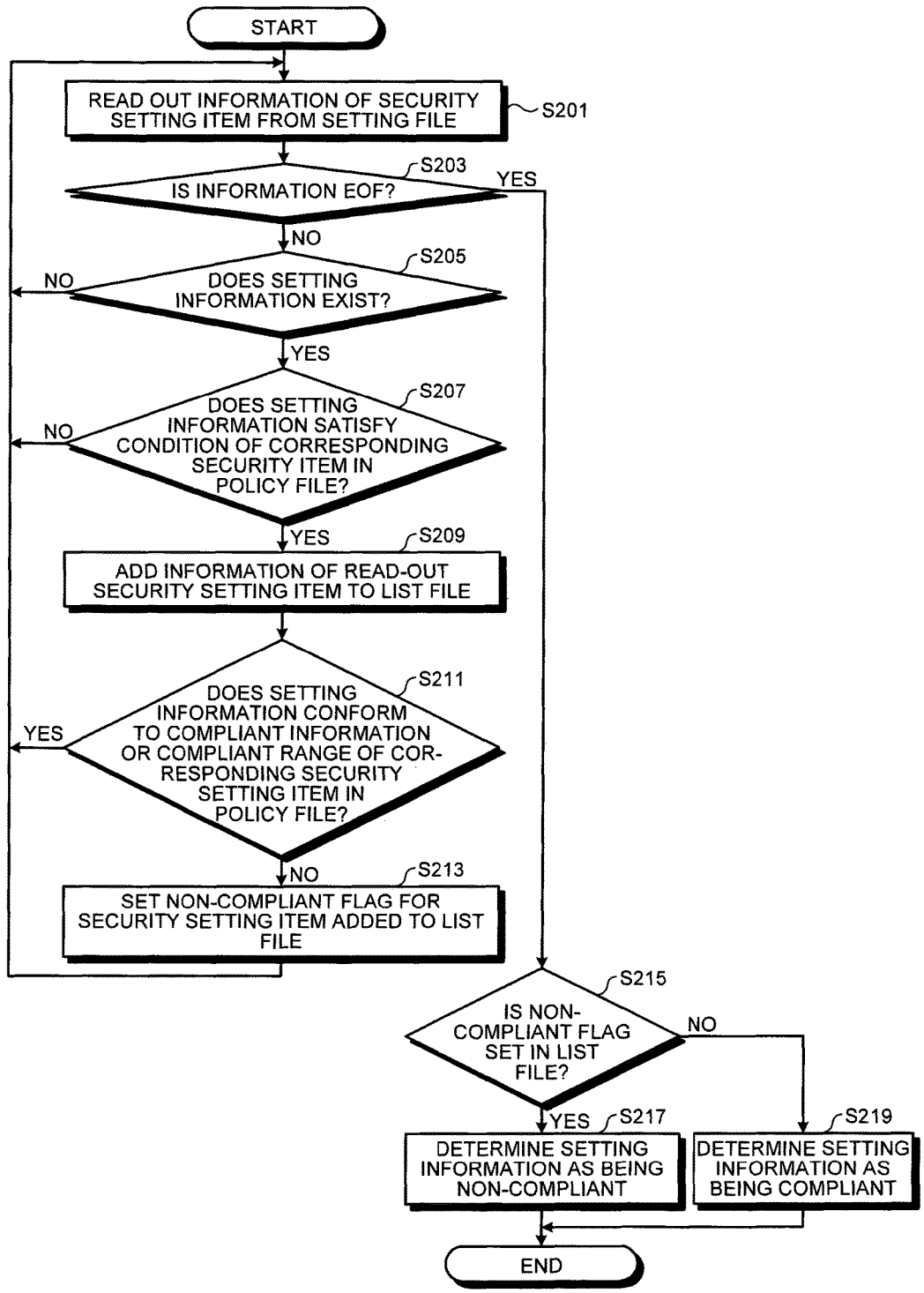
FIG. 10 is a flowchart illustrating an example of determination processing performed by a determination unit according to the first embodiment.

FIG. 10 is a flowchart illustrating an example of determination processing performed by the determination unit 159 according to the first embodiment.

First, the determination unit 159 reads out information (setting information and other kinds of information) of a security setting item from the setting file (Step S201).

When the information is not at the end of file (EOF) (No at Step S203), the read-out information of the security setting item includes setting information (Yes at Step S205), and the setting information satisfies a condition of the corresponding security setting item in the policy file or such a condition does not exist (Yes at Step S207), the determination unit 159 adds the read-out information of the security setting item to a list file (Step S209).

Next, the determination unit 159 determines whether the read-out setting information of the security setting item conforms to compliant information or a compliant range of the corresponding security setting item in the policy file (Step S211).

When the setting information does not conform (No at Step S211), a non-compliant flag is set for the security setting item added to the list file at Step S209 (a non-compliant flag is added to the information of the security setting item) (Step S213).

The processing then returns to Step S201. When the read-out information of the security setting item does not include setting information (No at Step S205), when the condition of the corresponding security setting item in the policy file is not satisfied (No at Step S207), or when the setting information conforms (Yes at Step S211), the processing returns to Step S201. Then, the determination unit 159 reads out information of a new security setting item from the setting file.

When the information is at EOF (Yes at Step S203), the determination unit 159 confirms whether a non-compliant flag is set in the list file (Step S215). When a non-compliant flag is set in the list file (Yes at Step S215), the determination unit 159 determines that there is a security setting item whose setting information does not conform in the setting file (non-compliant) (Step S217). When a non-compliant flag is not set in the list file (No at Step S215), the determination unit 159 determines that there is no security setting item whose setting information does not conform in the setting file (compliant) (Step S219).

Figure 11:
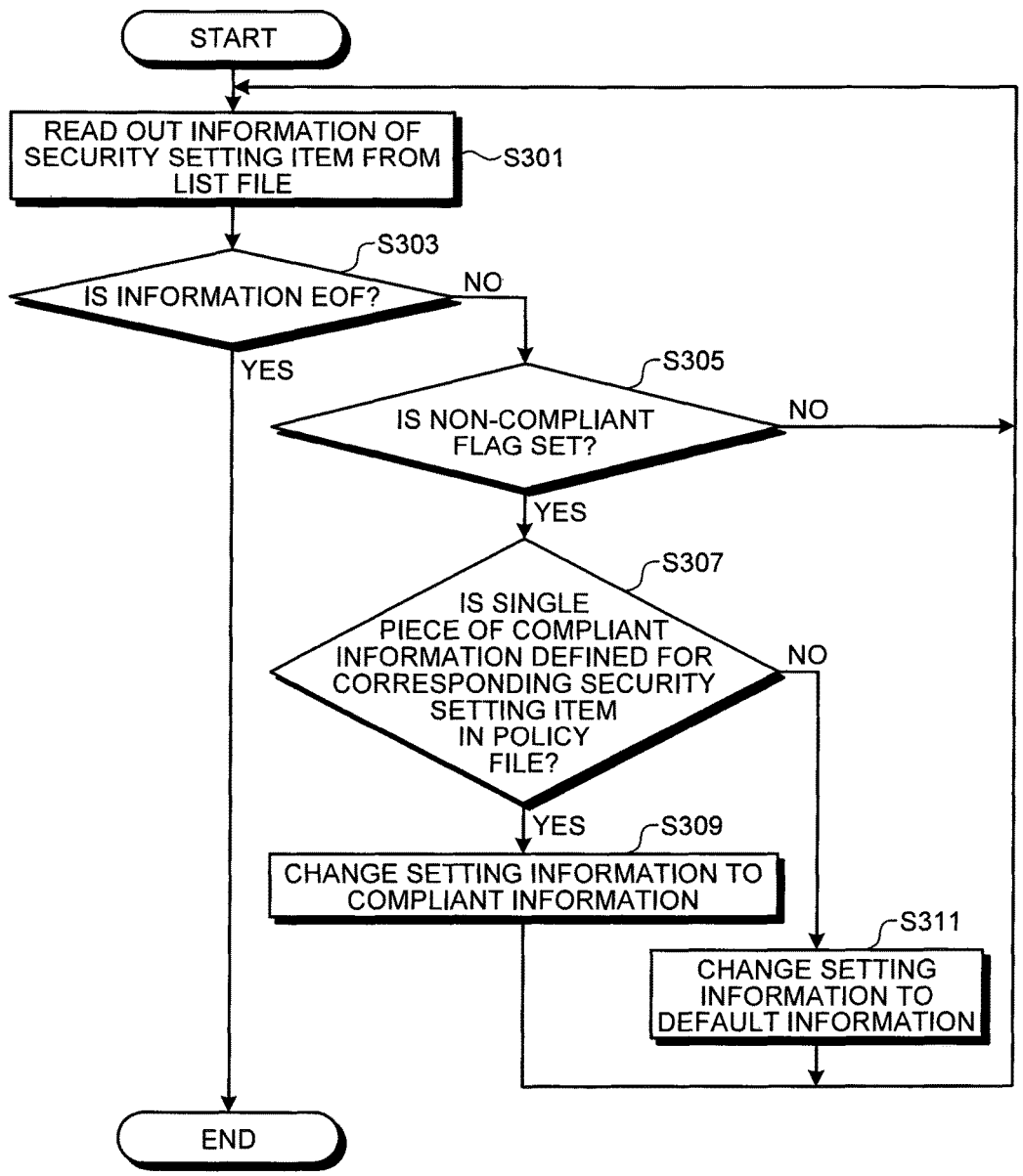
FIG. 11 is a flowchart illustrating an example of change processing performed by a change unit according to the first embodiment.

FIG. 11 is a flowchart illustrating an example of change processing performed by the change unit 161 according to the first embodiment.

First, the change unit 161 reads out information (setting information and the like) of a security setting item from a list file (Step S301).

When the information is not at EOF (No at Step S303), and a non-compliant flag is set for the read-out security setting item (the information of the security setting item includes a non-compliant flag) (Yes at Step S305), and if a single piece of compliant information is defined for the corresponding security setting item in the policy file (Yes at Step S307), the change unit 161 changes the setting information of the corresponding security setting item to the piece of compliant information in the setting file (Step S309). By contrast, when a single piece of compliant information is not defined for the corresponding security setting item in the policy file (No at Step S307), the setting information of the corresponding security setting item is changed to default information in the setting file (Step S311).

The processing then returns to Step S301. Note that also when a non-compliant flag is not set for the read-out security setting item (the information of the security setting item does not include a non-compliant flag) (No at Step S305), the processing returns to Step S301. Then, the change unit 161 reads out information of a new security setting item from the list file.

When the information is at EOF (Yes at Step S303), the change unit 161 finishes the processing. Note that when the change unit 161 finishes processing, there has been generated a setting file after change in which non-compliant setting information has been changed to default information or compliant information.

As described above, in the first embodiment, whether the setting information of a security setting item is a single piece of compliant information, whether it is any one of a plurality of pieces of compliant information, or whether it is information included in a compliant range is confirmed. In this manner, whether the security setting conforms to the standards or authentication related to security can be confirmed easily.

Note that the standards or authentication related to security often require, for satisfying the standards or authentication, a number of security setting items to have setting information of either one piece of compliant information or any one of a plurality of pieces of compliant information, or setting information included in a compliant range.

Moreover, in the first embodiment, when the setting information of a security setting item does not conform to the policy, the setting information is changed so as to conform to the policy, and then the security setting is performed in the device. Thus, even when the security setting does not conform to the standards or authentication due to the use of the device, the state can be restored conforming to the standards or authentication and the state conforming to the standards or authentication can be maintained easily.

Second Embodiment

The second embodiment describes an example in which the setting information of a security setting item is changed to compliant information or information in a compliant range in accordance with security level. In the following, the difference from the first embodiment will be mainly described. The components having the same functions as in the first embodiment are represented with same names and symbols as in the first embodiment, and the description thereof will be omitted.

Figure 12:
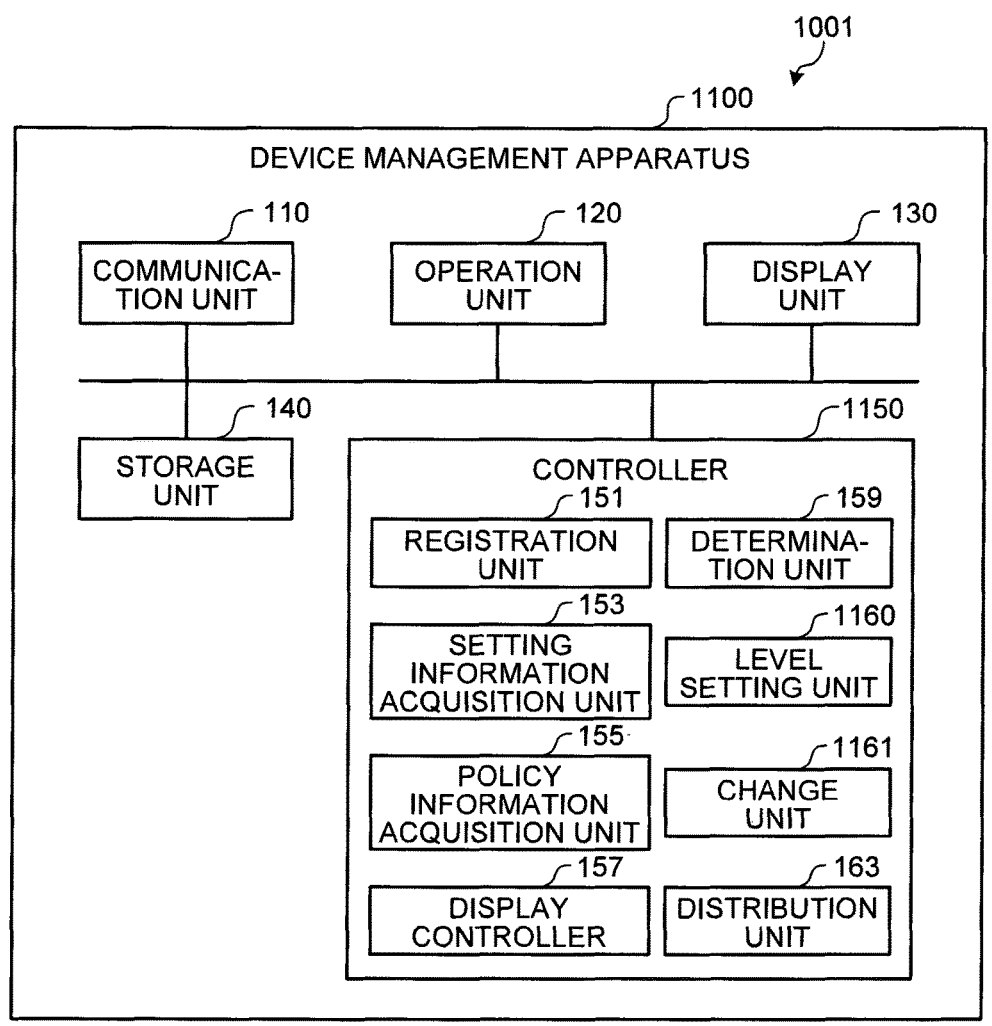
FIG. 12 is a block diagram illustrating an example of a configuration of a device management apparatus according to a second embodiment.

FIG. 12 is a block diagram illustrating an example of a configuration of a device management apparatus 1100 in a device management system 1001 according to the second embodiment. As illustrated in FIG. 12, the second embodiment is different from the first embodiment in a level setting unit 1160 and a change unit 1161 of a controller 1150.

The level setting unit 1160 sets security level. To be more specific, the level setting unit 1160 sets security level based on a setting instruction (setting operation input) by the user from the operation unit 120. In the second embodiment, the level setting unit 1160 sets the security level to any of "strong", "default", and "weak". However, the security level is not limited to these three kinds.

As a result of the determination made by the determination unit 159, when the setting information of any security setting item (hereinafter, referred to as a "security setting item to be changed") of one or more security setting items defined by the setting file acquired by the setting information acquisition unit 153 does not conform, and if a plurality of pieces of compliant information or a compliant range is defined for the security setting item to be changed in the policy file, the change unit 1161 changes the setting information of the security setting item to be changed to compliant information or information in a compliant range in accordance with security level of the security setting item to be changed.

For example, when the type is a selected-type or a range-type in the policy file illustrated in FIG. 3, compliant value indicated on the leftmost side is a compliant value corresponding to the security level "weak", a compliant value indicated on the rightmost side is a compliant value corresponding to the security level "strong", and a default value is a compliant value corresponding to the security level "default". It is supposed that in this example, the policy file illustrated in FIG. 3 is designed considering the security level.

In this case, when the security level is "weak", the change unit 1161 sets a setting value of the security setting item to be changed to a compliant value indicated on the leftmost side in the compliant value/compliant range of the security setting item to be changed. When the security level is "strong", the change unit 1161 sets a setting value of the security setting item to be changed to a compliant value indicated on the rightmost side in the compliant value/compliant range of the security setting item to be changed. When the security level is "default", the change unit 1161 sets a setting value of the security setting item to be changed to a default value of the security setting item to be changed.

Figure 13:
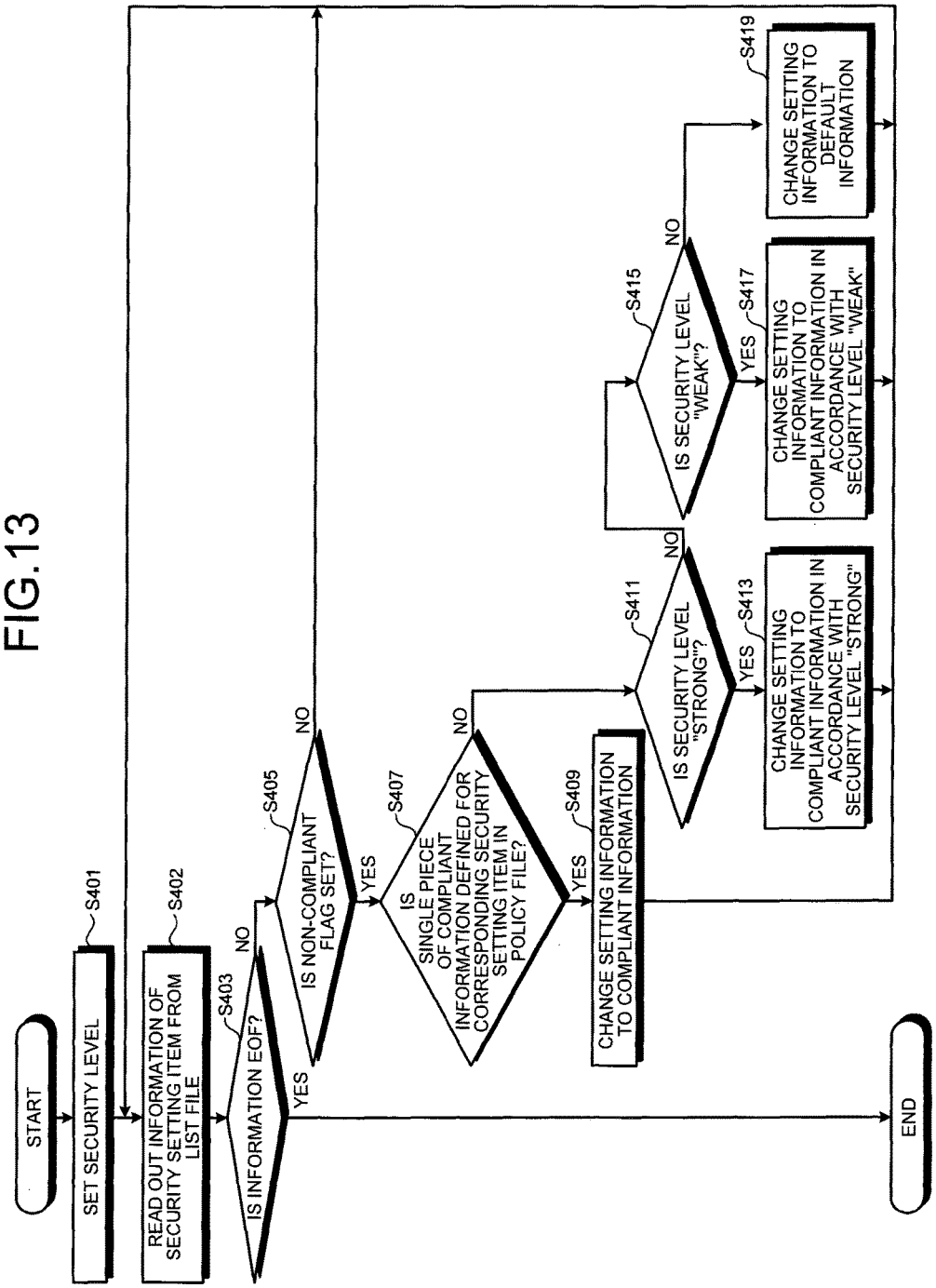
FIG. 13 is a flowchart illustrating an example of change processing performed by a change unit according to the second embodiment.

FIG. 13 is a flowchart illustrating an example of change processing performed by the change unit 1161 according to the second embodiment.

First, the level setting unit 1160 sets security level based on a setting instruction (setting operation input) by a user from the operation unit 120 (Step S401). However, the processing at Step S401 may be performed not in change processing but at any timing before change processing.

Next, the processing at Step S402 to Step S409 is, the same as the processing at Step S301 to Step S309 in FIG. 11. However, in the case of No at Step S405, or after Step S409, the processing returns to Step S402.

Subsequently, when a single piece of compliant information is not defined for the corresponding security setting item in the policy file (No at Step S407), and if the security level is "strong" (Yes at Step S411), the change unit 1161 changes the setting information of the corresponding security setting item in the setting file to compliant information or information in a compliant range in accordance with the security level "strong" (Step S413), and the processing returns to Step S402.

When the security level is "weak" (No at Step S411, Yes at Step S415), the change unit 1161 changes the setting information of the corresponding security setting item in the setting file to compliant information or information in a compliant range in accordance with the security level "weak" (Step S417), and the processing returns to Step S402.

When the security level is "default" (No at Step S411, No at Step S415), the change unit 1161 changes the setting information of the corresponding security setting item in the setting file to default information (Step S419), and the processing returns to Step S402.

As described above, in the second embodiment, the security setting of the device can be not only set to a state conforming to the standards or authentication but also performed for the device in accordance with security level.

Third Embodiment

The third embodiment describes an example in which the security setting is performed for a plurality of kinds of devices. In the following, the difference from the first embodiment will be mainly described. The components having the same functions as in the first embodiment are represented with same names and symbols as in the first embodiment, and the description thereof will be omitted.

Figure 14:
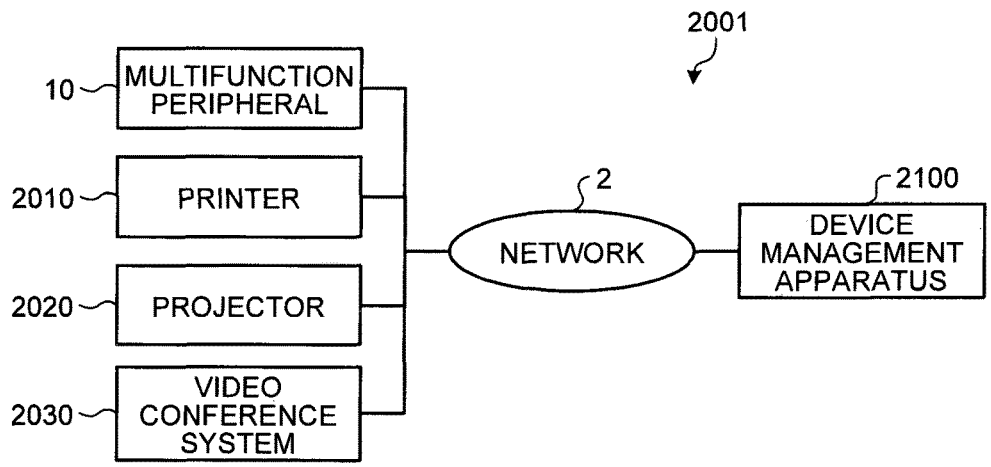
FIG. 14 is a block diagram illustrating an example of a configuration of a device management system according to a third embodiment.

FIG. 14 is a block diagram illustrating an example of a configuration of a device management system 2001 according to the third embodiment. As illustrated in FIG. 14, the third embodiment is different from the first embodiment in that the devices to be managed of a device management apparatus 2100 are the multifunction peripheral 10, a printer 2010, a projector 2020, and a video conference system 2030.

Figure 15:
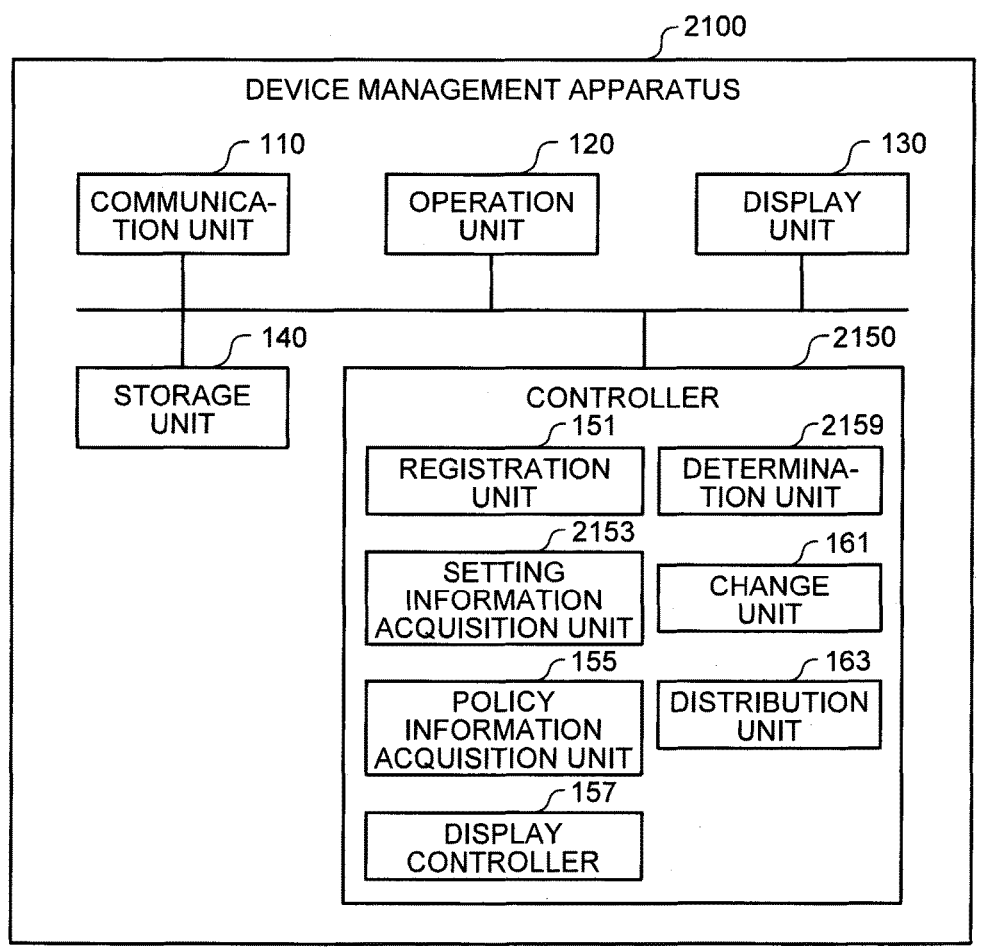
FIG. 15 is a block diagram illustrating an example of a configuration of a device management apparatus according to the third embodiment.

FIG. 15 is a block diagram illustrating an example of a configuration of the device management apparatus 2100 according to the third embodiment. As illustrated in FIG. 15, the third embodiment is different from the first embodiment in a setting information acquisition unit 2153 and a determination unit 2159 of a controller 2150.

The setting information acquisition unit 2153 acquires, from the multifunction peripheral 10, the printer 2010, the projector 2020, and the video conference system 2030, setting files and kind information indicating kinds of such devices. In the third embodiment, the kind is a multifunction peripheral, a printer, a projector, and a video conference system. However, the kind is not limited thereto, and may be determined depending on a device to be managed by the device management apparatus 2100.

FIG. 16 is a diagram illustrating an example of a policy file according to the third embodiment. In the policy file illustrated in FIG. 16, the kind is further defined and associated with the security setting items. The kind indicates a kind of a device to which the security setting item is applied, and indicates common, a multifunction peripheral, a printer, a projector, and a video conference system. Note that common indicates that the security setting item is applied to any of a multifunction peripheral, a printer, a projector, and a video conference system.

The determination unit 2159 determines whether each piece of the setting information of one or more security setting items conforms based on the kind information acquired by the setting information acquisition unit 2153 and the policy file.

To be more specific, the determination unit 2159 determines whether a setting value of a security setting item to be determined conforms to the compliant value/compliant range associated with the security setting item to be determined and the kind indicated by the kind information in the policy file.

Note that in the third embodiment, the processing illustrated in FIG. 9 (Step S103 to Step S115 in detail) may be performed in series or in parallel on the multifunction peripheral 10, the printer 2010, the projector 2020, and the video conference system 2030.

That is, when the processing illustrated in FIG. 9 on the multifunction peripheral 10 is finished, the processing illustrated in FIG. 9 on the printer 2010 may be performed. Subsequently, every time the processing is finished, the processing illustrated in FIG. 9 on the projector 2020, and then the processing illustrated in FIG. 9 on the video conference system 2030 may be performed.

Moreover, when the processing at Step S103 on the multifunction peripheral 10, the printer 2010, the projector 2020, and the video conference system 2030 is finished, the processing at Step S105 on the multifunction peripheral 10, the printer 2010, the projector 2020, and the video conference system 2030 may be then performed. Subsequently, when the processing at the corresponding step on the multifunction peripheral 10, the printer 2010, the projector 2020, and the video conference system 2030 is finished, the processing at the following step may be performed on the multifunction peripheral 10, the printer 2010, the projector 2020, and the video conference system 2030.

As described above, in the third embodiment, even when a plurality of kinds of devices are managed, whether the security setting conforms to the standards or authentication related to security can be confirmed easily. Furthermore, in the third embodiment, even when various kinds of devices are managed, the state conforming to the standards or authentication can be maintained more easily.

Fourth Embodiment

The fourth embodiment describes an example in which the security setting is remotely performed on the device. In the following, the difference from the first embodiment will be mainly described. The components having the same functions as in the first embodiment are represented with same names and symbols as in the first embodiment, and the description thereof will be omitted.

Figure 17:
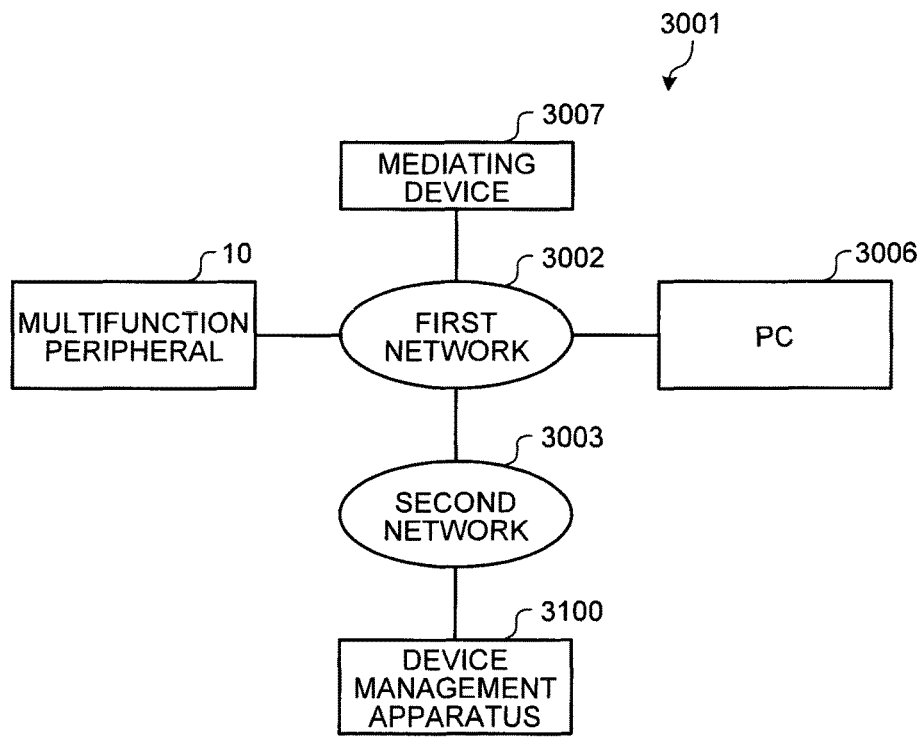
FIG. 17 is a block diagram illustrating an example of a configuration of a device management system according to a fourth embodiment.

FIG. 17 is a block diagram illustrating an example of a configuration of a device management system 3001 according to the fourth embodiment. As illustrated in FIG. 17, in the device management system 3001 of the fourth embodiment, the multifunction peripheral 10, a PC 3006, and a mediating device 3007 are connected to a first network 3002, a device management apparatus 3100 is connected to a second network 3003, and the first network 3002 is connected to the second network 3003.

The first network 3002 can be achieved by a local area network (LAN), for example, and the second network 3003 can be achieved by the Internet, for example.

The mediating device 3007 mediates (relays) communication when the device management apparatus 3100 performs communication with the multifunction peripheral 10 or the PC 3006, and the relay can be achieved by a typical computer.

Figure 18:
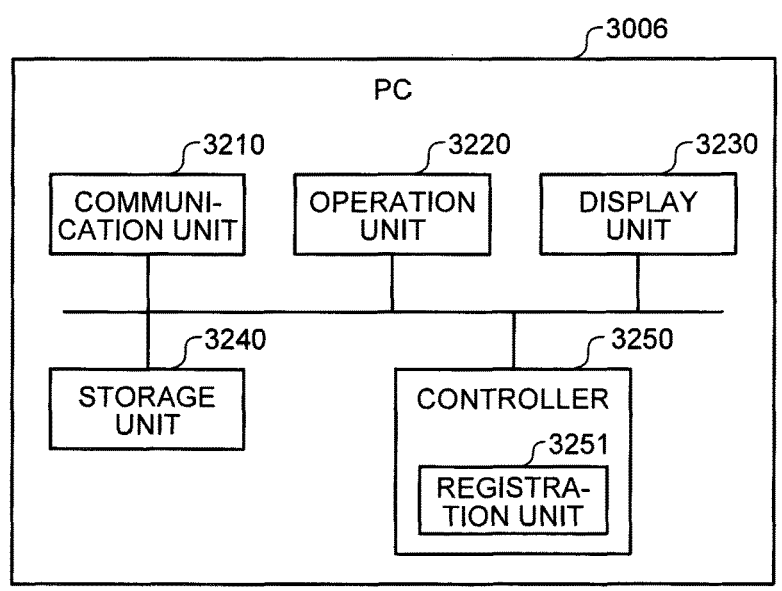
FIG. 18 is a block diagram illustrating an example of a configuration of a PC according to the fourth embodiment.

FIG. 18 is a block diagram illustrating an example of a configuration of the PC 3006 according to the fourth embodiment. As illustrated in FIG. 18, the PC 3006 includes a communication unit 3210, an operation unit 3220, a display unit 3230, a storage unit 3240, and a controller 3250.

The communication unit 3210 performs communication with an external device such as the device management apparatus 3100 through the first network 3002, the mediating device 3007, and the second network 3003, and the communication can be achieved by a communication device such as an NIC.

The operation unit 3220 is used for various types of operation input, and can be achieved with an input device, such as a keyboard, a mouse, a touch pad, or a touch panel.

The display unit 3230 displays various screens, and can be achieved with a display device, such as a liquid crystal display or a touch panel display.

The storage unit 3240 stores therein various computer programs such as a computer program executed by the PC 3006 and data used for various kinds of processing performed by the PC 3006, for example. In the embodiment, the storage unit 3240 stores therein the policy file.

The controller 3250 controls each unit of the PC 3006, and can be achieved by the control device such as a CPU. The controller 3250 includes a registration unit 3251.

The registration unit 3251 registers the policy file in the storage unit 3240. To be more specific, the registration unit 3251 registers the policy file in the storage unit 3240 based on a registration instruction (registration operation input) by a user from the operation unit 3220. In this manner, the storage unit 3240 stores therein the policy file.

Figure 19:
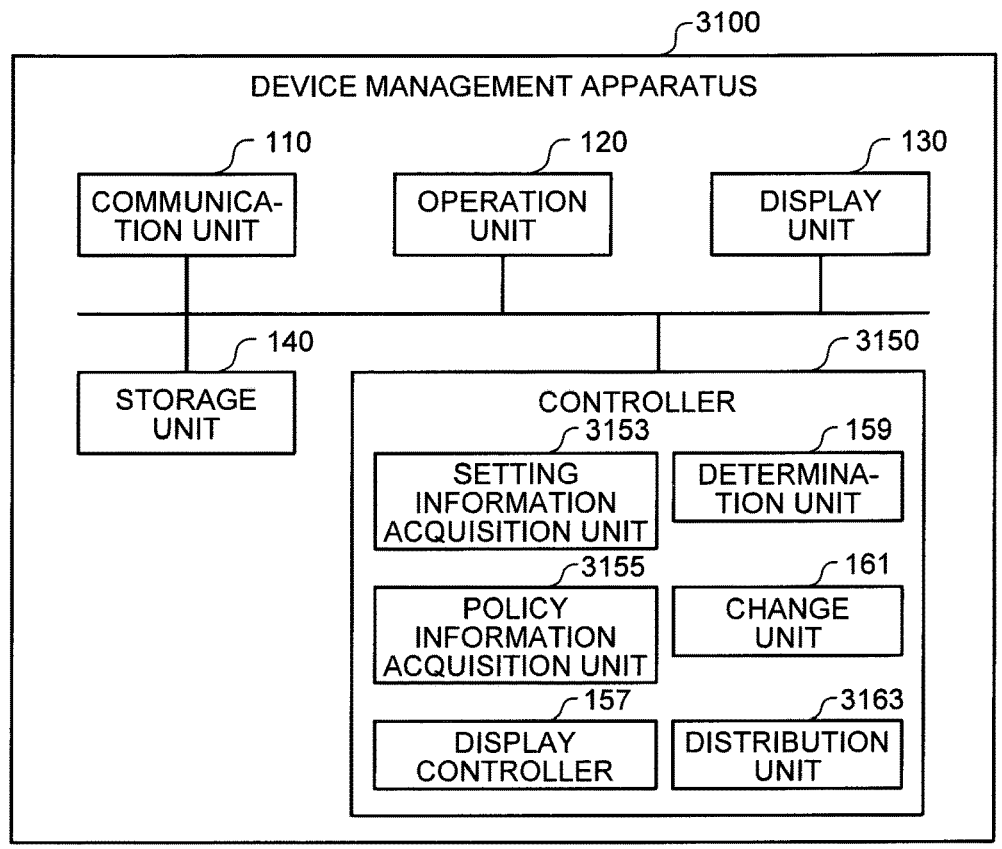
FIG. 19 is a block diagram illustrating an example of a configuration of a device management apparatus according to the fourth embodiment.

FIG. 19 is a block diagram illustrating an example of a configuration of the device management apparatus 3100 according to the fourth embodiment. As illustrated in FIG. 19, the fourth embodiment is different from the first embodiment in that a controller 3150 does not include a registration unit but includes a setting information acquisition unit 3153, a policy information acquisition unit 3155, and a distribution unit 3163.

The setting information acquisition unit 3153 acquires a setting file from the multifunction peripheral 10 through the mediating device 3007.

The policy information acquisition unit 3155 acquires a policy file from the PC 3006 through the mediating device 3007.

The distribution unit 3163 distributes a setting file after change generated by the change unit 161 to the multifunction peripheral 10 through the mediating device 3007.

As described above, in the fourth embodiment, whether the security setting conforms to the standards or authentication related to security can be confirmed easily even when the device is managed remotely. Moreover, in the fourth embodiment, even when the device is managed remotely, the state conforming to the standards or authentication can be maintained more easily.

Modifications

The invention is not limited to the embodiments described above and various modifications can be made. For example, the above-described embodiments can be appropriately combined.

Hardware Configuration

Figure 20:
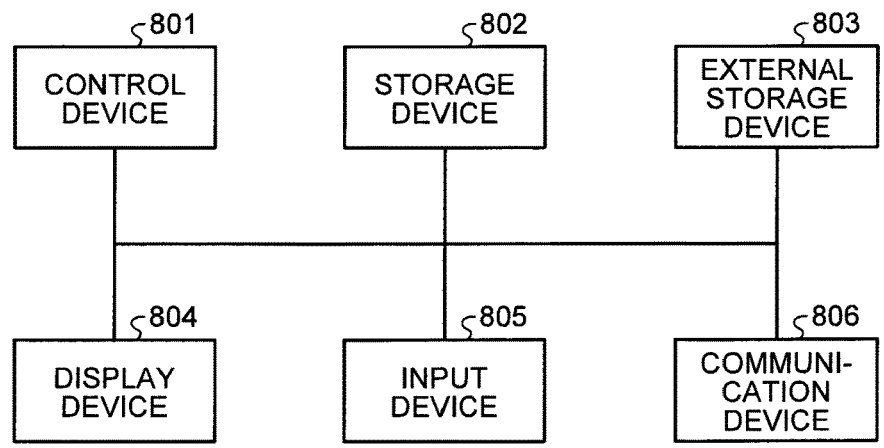
FIG. 20 is a block diagram illustrating an example of a hardware configuration of the device management apparatus and the PC according to the embodiments.

FIG. 20 is a block diagram illustrating an example of a hardware configuration of the device management apparatus and the PC of the embodiments. The device management apparatus and the PC of the embodiments include a control device 801 such as a CPU, a storage device 802 such as a ROM or a RAM, an external storage device 803 such as an HDD, a display device 804 such as a display, an input device 805 such as a keyboard or a mouse, and a communication device 806 such as a communication interface, and have a hardware configuration including a typical computer.

Computer programs executed by the device management apparatus and the PC in the embodiments are stored in a computer-readable storage medium as a file in an installable or executable format, and provided. Examples of the computer-readable storage medium include a CD-ROM, a CD-R, a memory card, a digital versatile disc (DVD), and a flexible disk (FD).

The programs executed by the device management apparatus and the PC in the embodiments may be stored in a computer connected to a network such as the Internet and provided by being downloaded through the network. The programs executed by the device management apparatus and the PC in the embodiments may be provided or delivered through a network such as the Internet. The programs executed by the device management apparatus and the PC in the embodiments may be provided by being preliminarily stored in a ROM, for example.

The programs executed by the device management apparatus and the PC in the embodiments have a module structure that implements the units described above in a computer. In practical hardware, the CPU reads out the programs from the HDD to the RAM and executes the programs, so that the respective units can be implemented in the computer.

According to the embodiments, it is possible to make it easier to maintain a state where the security setting of a device conforms to the standards or authentication related to security.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A device management apparatus comprising:
processing circuitry configured to
    acquire setting information of one or more security setting items from a device, the setting information including one or more specific settings including a default value that is to conform with policy information, the policy information defining a single piece of compliant information, a plurality of pieces of pieces of compliant information, or a compliant range;
    acquire the policy information for each security setting item;
    determine whether the setting information of the one or more security setting items matches a specific condition required by the single piece of compliant information, the plurality of pieces of pieces of compliant information, or the compliant range defined by the policy information;
    change, when a corresponding piece of the setting information of any one of the security setting items does not match with the specific condition of the policy information, the corresponding piece of the setting information so as to match with the corresponding single piece of the policy information, any one of the corresponding plurality of pieces of pieces of compliant information, or lie within the corresponding compliant range defined by the specific condition of policy information; and
    distribute the changed setting information of the security setting item to the device.

2. The device management apparatus according to claim 1, wherein
the policy information defines, for the security setting item for which one or more pieces of compliant information are defined, default information corresponding to any one of the pieces of compliant information,
the policy information defines, for the security setting item for which the compliant range is defined, default information included in the compliant range, and
the processing circuitry changes, when a corresponding piece of the setting information of any one of the security setting items does not match with the specific condition of the policy information and the policy information defines the pieces of compliant information or the compliant range for the any one of the security setting items, the corresponding piece of the setting information to the corresponding default information of the any one of the security setting items.

3. The device management apparatus according to claim 1, wherein the processing circuitry sets a security level, wherein
the processing circuitry changes, when a corresponding piece of the setting information of any one of the security setting items does not match with the specific condition of the policy information and the policy information defines the pieces of compliant information or the compliant range for the any one of the security setting items, the corresponding piece of the setting information to the compliant information or information in the compliant range in accordance with the security level of the any one of the security setting items.

4. The device management apparatus according to claim 1, wherein the processing circuitry changes, when a corresponding piece of the setting information of any one of the security setting items does not match with the specific condition of the policy information and the policy information defines the single piece of compliant information for the any one of the security setting items, the corresponding piece of the setting information to the single piece of information of the any one of the security setting items.

5. The device management apparatus according to claim 1, wherein the processing circuitry determines, for the security setting item for which the policy information defines the single piece of compliant information, whether the corresponding piece of the setting information of the security setting item matches with the single piece of compliant information of the security setting item.

6. The device management apparatus according to claim 1, wherein the processing circuitry determines, for the security setting item for which the policy information defines the pieces of compliant information, whether the corresponding piece of the setting information of the security setting item matches with any one of the pieces of compliant information of the security setting item.

7. The device management apparatus according to claim 1, wherein the processing circuitry determines, for the security setting item for which the policy information defines the compliant range, whether the corresponding piece of the setting information of the security setting item lies within the compliant range of the security setting item.

8. The device management apparatus according to claim 1, wherein the processing circuitry further acquires kind information indicating a kind of the device from the device,
the policy information defines a kind of the applied device for each security setting item, and
the processing circuitry determines whether each piece of the setting information of the one or more security setting items matches the kind information and the policy information.

9. The device management apparatus according to claim 1, further comprising a display controller that displays determination results of the processing circuitry on a display.

10. The device management apparatus according to claim 1, further comprising a memory that stores therein the policy information, wherein the processing circuitry acquires the policy information from the memory.

11. The device management apparatus according to claim 10, wherein the processing circuitry is configured to register the policy information in the storage unit.

12. A device management system comprising:
processing circuitry configured to
acquire setting information of one or more security setting items from a device, the setting information including one or more specific settings including a default value that is to conform with policy information, the policy information defining a single piece of compliant information, a plurality of pieces of pieces of compliant information, or a compliant range;
acquire the policy information for each security setting item;
determine whether the setting information of the one or more security setting items matches a specific condition required by the single piece of compliant information, the plurality of pieces of pieces of compliant information, or the compliant range defined by the policy information;
change, when a corresponding piece of the setting information of any one of the security setting items does not match with the specific condition of the policy information, the corresponding piece of the setting information so as to match with the corresponding single piece of the policy information, any one of the corresponding plurality of pieces of pieces of compliant information, or lie within the corresponding compliant range defined by the specific condition of policy information; and
distribute the changed setting information of the security setting item to the device.

13. A security setting method comprising:
acquiring setting information of one or more security setting items from a device, the setting information including one or more specific settings including a default value that is to conform with policy information, the policy information defining a single piece of compliant information, a plurality of pieces of pieces of compliant information, or a compliant range;
acquiring the policy information for each security setting item;
determining whether the setting information of the one or more security setting items matches a specific condition required by the single piece of compliant information, the plurality of pieces of pieces of compliant information, or the compliant range defined by the policy information;
changing, when a corresponding piece of the setting information of any one of the security setting items does not match with the specific condition of the policy information, the corresponding piece of the setting information so as to match with the corresponding single piece of the policy information, any one of the corresponding plurality of pieces of pieces of compliant information, or lie within the corresponding compliant range defined by the specific condition of policy information; and
distributing the changed setting information of the security setting item to the device.

* * * * *